(12) United States Patent
Ho et al.

(10) Patent No.: US 12,094,158 B2
(45) Date of Patent: Sep. 17, 2024

(54) ENCODED SUBSTRATE, COORDINATE-POSITIONING SYSTEM AND METHOD THEREOF

(71) Applicant: INDUSTRIAL TECHNOLOGY RESEARCH INSTITUTE, Hsinchu (TW)

(72) Inventors: Tan-Chi Ho, New Taipei (TW); Yi-Chun Chen, Zhubei (TW); Wen Tsui, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 354 days.

(21) Appl. No.: 17/561,597

(22) Filed: Dec. 23, 2021

(65) Prior Publication Data

US 2023/0124210 A1    Apr. 20, 2023

(30) Foreign Application Priority Data

Oct. 20, 2021  (TW) .................................. 110138902

(51) Int. Cl.
*G06T 7/73*  (2017.01)
*G06T 7/13*  (2017.01)
(Continued)

(52) U.S. Cl.
CPC .................. *G06T 7/73* (2017.01); *G06T 7/13* (2017.01); *G06V 10/225* (2022.01); *G06Q 10/087* (2013.01); *G06T 2207/30204* (2013.01)

(58) Field of Classification Search
CPC ... G06T 7/73; G06T 7/13; G06T 2207/30204; G06V 10/225; G06Q 10/087
See application file for complete search history.

(56) References Cited

U.S. PATENT DOCUMENTS

| 8,090,194 B2 * | 1/2012 | Golrdon | G06V 10/145 |
| | | | 382/154 |
| 10,963,657 B2 * | 3/2021 | Rodriguez | G06V 10/464 |

(Continued)

FOREIGN PATENT DOCUMENTS

| CN | 104105951 A | 10/2014 |
| CN | 108831011 A | 11/2018 |

(Continued)

OTHER PUBLICATIONS

Garrido-Jurado et al., "Automatic generation and detection of highly reliable fiducial markers under occlusion" Pattern Recognition 47 (2014) 2280-2292, Jan. 21, 2014.

(Continued)

*Primary Examiner* — Shefali D Goradia
(74) *Attorney, Agent, or Firm* — Maschoff Brennan (57) ABSTRACT

An encoded substrate to be filmed by a camera device for generating an image is provided. The encoded substrate includes a plurality of grids arranged in a form of two-dimensional array, wherein each grid includes a first pattern and a second pattern not overlapped with each other. The first pattern corresponds to a first-dimensional encoded value, and the second pattern corresponds to a second-dimensional encoded value. The image is processed by a processor for scanning the plurality of grids. In a first-dimensional direction, the processor outputs a first coordinate according to at least two first patterns corresponding to at least two consecutive grids among the plurality of grids. In a second-dimensional direction, the processor outputs a second coordinate according to at least two second patterns corresponding to at least two consecutive grids among the plurality of grids.

8 Claims, 8 Drawing Sheets

(51) Int. Cl.
*G06V 10/22* (2022.01)
*G06Q 10/087* (2023.01)

(56) References Cited

U.S. PATENT DOCUMENTS

| | | |
|---|---|---|
| 2013/0075482 A1 | 3/2013 | Lapstun et al. |
| 2013/0156268 A1* | 6/2013 | Sonoda .................. G06F 11/10 |
| | | 382/106 |
| 2013/0204574 A1 | 8/2013 | Agrawal et al. |
| 2017/0193430 A1 | 7/2017 | Barreira Avegliano et al. |
| 2020/0117884 A1 | 4/2020 | Adato et al. |
| 2020/0273042 A1 | 8/2020 | Wang |
| 2023/0196707 A1* | 6/2023 | Zhao ..................... G06V 20/64 |
| | | 382/103 |
| 2023/0267642 A1* | 8/2023 | Xu ........................... G06T 7/73 |
| | | 382/103 |

FOREIGN PATENT DOCUMENTS

| | | |
|---|---|---|
| CN | 108846449 A | 11/2018 |
| CN | 109166233 A | 1/2019 |
| CN | 109409291 B | 3/2019 |
| CN | 111316301 A | 6/2020 |
| TW | 201911444 A | 3/2019 |
| TW | 202009781 A | 3/2020 |
| WO | WO-2008122070 A1 * 10/2008 ........... G06F 3/0321 |

OTHER PUBLICATIONS

Higa et al., "Robust Shelf Monitoring Using Supervised Learning for Improving On-Shelf Availability in Retail Stores" Sensors, 19, 2722, Jun. 14, 2019.
Yilmazer et al., "Shelf Auditing Based on Image Classification Using Semi-Supervised Deep Learning to Increase On-Shelf Availability in Grocery Stores" sensors, 21, 327, Jan. 6, 2021.
Ortiz-Fernandez et al., "Smart Artificial Markers for Accurate Visual Mapping and Localization" sensors, 21, 625, Jan. 18, 2021.
Romero-Ramirez et al., "Speeded up detection of squared fiducial markers" Image and Vision Computing 76, 38-47, Jun. 15, 2018.
Yu et al., "TopoTag: A Robust and Scalable Topological Fiducial Marker System" IEEE Transactions on Visualization and Computer Graphics, vol. 27, No. 9, Sep. 2021.
Marder et al., "Using image analytics to monitor retail store shelves" IBM J. Res. & Dev., vol. 59 No. 2/3, Paper 3, Mar./May 2015.
TW Office Action in Application No. 110138902 Dated Aug. 3, 2022.

* cited by examiner

ENCODED SUBSTRATE, COORDINATE-POSITIONING SYSTEM AND METHOD THEREOF

CROSS-REFERENCE TO RELATED APPLICATIONS

This non-provisional application claims the priority benefits under 35 U.S.C. § 119(a) of Taiwan Patent Application No. 110138902, filed on Oct. 20, 2021, the entire contents of which are hereby incorporated by references.

TECHNICAL FIELD

The present disclosure relates to an encoded substrate, a coordinate-positioning system and method thereof.

BACKGROUND

Commodity inventory is an important issue for the physical retail industry. According to statistics, the cost of product inventory in the physical retail industry accounts for a very high proportion of overall operating costs. Specifically, the existing inventory method is to directly check the quantity of goods on the shelf through manpower, to replenish the items with insufficient quantity of items. However, this kind of replenishment method requires a lot of labor and time costs, resulting in the inventory efficiency cannot be improved. In order to strengthen the operation management of the store, increase productivity and enhance the service experience, it is necessary to find an efficient inventory method to improve the overall replenishment efficiency and thereby save the company's personnel costs.

Object recognition technology based on computer vision has been successfully applied in various fields. The premise of this technology is that the size of the object captured by the camera device is sufficient to support the algorithm used for recognition. However, in a store, in order to effectively use the space, the goods are usually arranged closely on the shelf deck. At this time, the image captured by the camera device can only identify the frontmost product on the shelf, and the product located on the inner side of the shelf cannot be identified because of the problem of the occlusion of the front product, so the actual quantity of the products cannot be calculated.

SUMMARY

The disclosure provides an encoded substrate, a coordinate positioning system and method thereof.

According to one embodiment of this disclosure, an encoded substrate, adapted to being captured by a camera device to generate an image, comprises a plurality of grids arranged in a two-dimensional array, wherein each of the plurality of grids includes a first pattern and a second pattern that do not overlap, wherein the first pattern corresponds to a first-dimensional encoded value and the second pattern corresponds to a second-dimensional encoded value. The image is processed by a processor for scanning the plurality of grids. Wherein, in a first-dimensional direction, the processor outputs a first coordinate according to at least two first patterns corresponding to at least two grids consecutively arranged in the plurality of grids; and in a second-dimensional direction, the processor outputs a second coordinate according to at least two second patterns corresponding to at least two grids consecutively arranged in the plurality of grids.

According to another embodiment of this disclosure, a coordinate positioning method adapted to an encoded substrate is provided, wherein a plurality of objects are arranged on the encoded substrate, the encoded substrate includes a plurality of grids arranged in a two-dimensional array, and the method includes performing the following steps with a processor: controlling a camera device to photograph the encoded substrate and the objects to generate an image; in a first-dimensional direction, having found M grids arranged continuously from the plurality of grids; and in a second-dimensional direction, having found N grids arranged continuously from the plurality of grids, wherein M and N are positive integers; generating a first coordinate according to the M first-dimensional encoded values corresponding to the M first patterns; generating a second coordinate according to the N second-dimensional encoded values corresponding to the N second patterns; and outputting a positioning coordinate according to the first coordinate and the second coordinate; wherein the M first patterns corresponding to the M grids are not covered by the objects; the N second patterns corresponding to the N grids are not covered by the objects; and one of the M grids is the same as one of the N grids.

According to yet another embodiment of this disclosure, a coordinate positioning system, including an encoded substrate; a camera device, used to photograph the encoded substrate to generate an image; and a processor electrically connected to the camera device, and the processor is used to execute a coordinate positioning method according to the image to generate the positioning coordinate.

The foregoing will become better understood from a careful reading of a detailed description provided herein below with appropriate reference to the accompanying drawings.

DETAILED DESCRIPTION

Below, exemplary embodiments will be described in detail with reference to accompanying drawings, so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

The disclosure provides an encoded substrate, and a coordinate positioning system and method using the encoded substrate. The following introduces the composition of the encoded substrate first, and then describes the remaining devices of the coordinate positioning system and the operation of these devices. In general, when goods are put on the shelf, similar goods are usually close to each other, and the first row of goods located on the innermost side starts to be placed row by row to the outside against the back panel of the shelf. Therefore, in contrast to product recognition from the perspective of object recognition, the number of products can be accurately calculated from the remaining space of the shelf. The disclosure focuses on estimating the number of commodities from the remaining space of the shelf layer, so that the actual quantity of the products can be calculated. This prevents the issue that only the frontmost products on the shelf can be identified, while the products located on the inner side of the shelf cannot be identified because of the occlusion of the front products.

Figure 1:
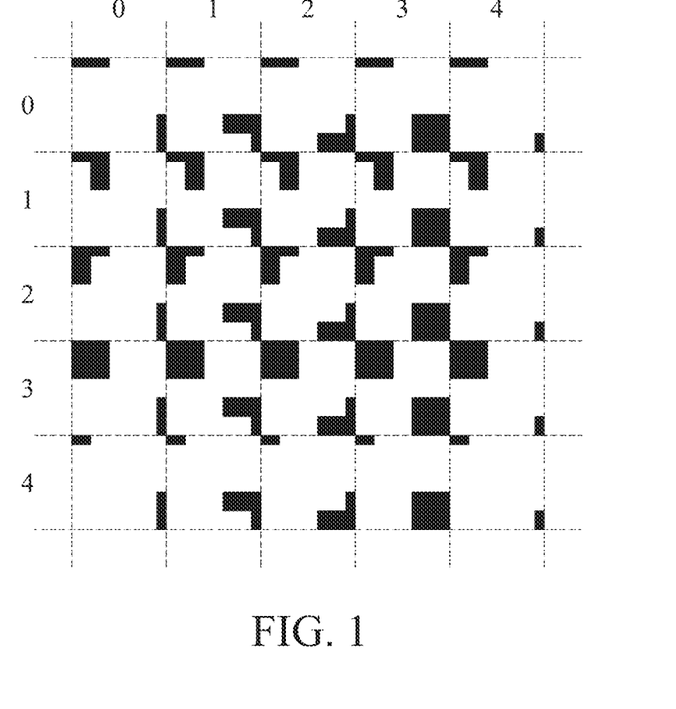
FIG. 1 is an example of an encoded substrate according to an embodiment of the disclosure.

FIG. 1 is an example of an encoded substrate according to an embodiment of the disclosure. The encoded substrate includes a plurality of grids arranged in a two-dimensional array. For example, the encoded substrate shown in FIG. 1 is composed of 25 grids arranged in a 5×5 two-dimensional array. The disclosure does not limit the shape of the two-dimensional array to be square. For a two-dimensional planar structure of any shape, any combination of the grids described below belongs to the scope of the encoded substrate proposed by the disclosure. In practical applications, considering the shape of the shelf, the encoded substrate can be a non-square rectangle.

Figure 2:
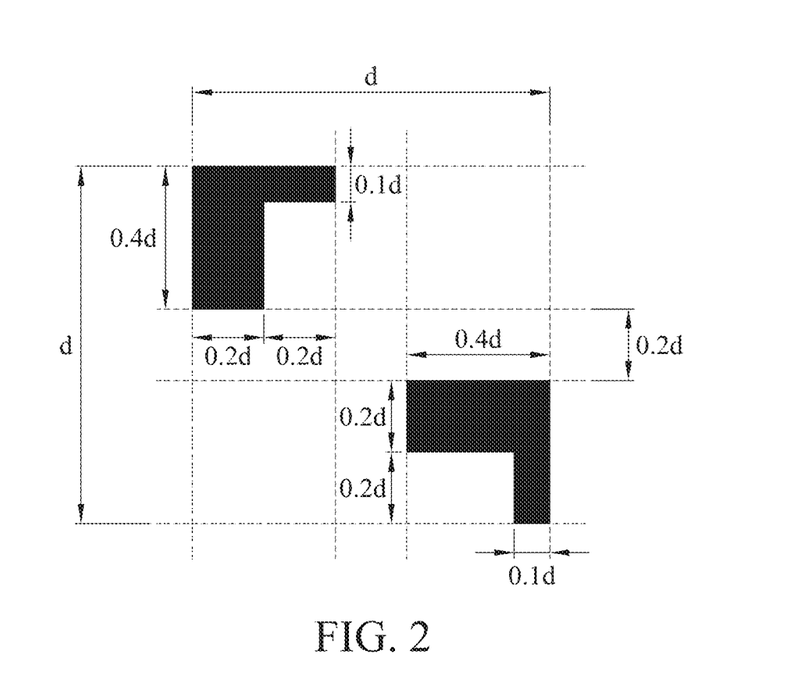
FIG. 2 is an example of a grid according to an embodiment of the disclosure.

FIG. 2 is an example of a grid according to an embodiment of the disclosure. Each grid includes a first pattern and a second pattern that do not overlap. In this example, the first pattern is located at the upper left corner of the grid, and the second pattern is located at the lower right corner of the grid. From another perspective, each grid has a visual style. This visual style includes two patterns. A blank area is reserved between the first pattern and the second pattern. In other words, the grid satisfies the conditions: at least one horizontal scan line can be found across the grid, but not through the first pattern and the second pattern at the same time, and at least one vertical scan line can be found across the grid, but not through the first pattern and the second pattern at the same time. Through the above arrangement, it can be ensured that the first pattern and the second pattern in the current grid do not touch each other, and the probability of misjudgment in image recognition is reduced.

In the example shown in FIG. 2, the shape of the grid is square and the side length is d. Each of the first pattern and the second pattern has two sides aligned with the boundary of the grid, and the side lengths are shown in FIG. 2. However, the values in FIG. 2 are only examples and are not intended to limit the disclosure. These values can be adjusted according to actual design requirements, and the grid can be a non-square rectangle.

Figure 3:
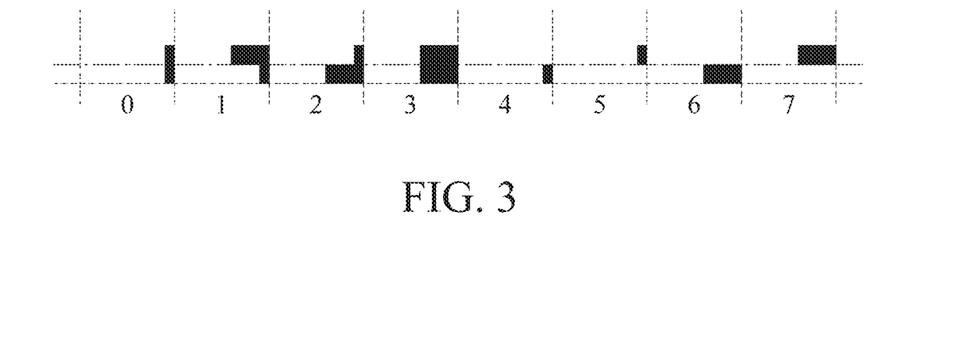
FIG. 3 is an exemplary diagram showing a corresponding relationship between coded value and pattern according to an embodiment of the disclosure.

The visualization style of the two-dimensional plane presented by the encoded substrate is based on a two-dimensional grid system for the assignment of coordinate encoded values, wherein the first pattern corresponds to the first-dimension (such as the X axis) encoded value, and the second pattern corresponds to the second-dimension (such as Y-axis) encoded value. Please refer to FIG. 3, which shows an example of the corresponding relationship between the code value and the pattern. As shown in FIG. 3, the eight code values 0~7 respectively correspond to eight different patterns, and each pattern can be divided into upper and lower parts. Please refer to the examples of side length in FIG. 3 and FIG. 2 together. The pixel blocks of each part can be divided into three types according to the side length, and the three types are 1 ×2, 4×2, and 0×0 (that means blank, no pixels filled), respectively, therefore, except for the pixel blocks whose upper and lower parts are both 0×0 type, which are not suitable for representing the encoded value, there are eight patterns (3×3−1) that can be combined by the two pixel blocks. However, the disclosure does not limit the pattern to be composed of several parts, nor does it limit the number of types of pixel blocks in each part. In practice, the above parameters can be determined according to the grid size and the required plane size to be encoded. In addition, the corresponding relationship shown in FIG. 3 is applicable to the first dimension or the second dimension. Please refer to FIG. 1 and FIG. 3 together, and rotate the corresponding relationship shown in the horizontal direction (first dimension) in FIG. 3 by 90 degrees to obtain the corresponding relationship in the vertical direction (second dimension).

Please refer to the encoded substrate shown in FIG. 1 again. Among the multiple grids constituting the encoded substrate, if two grids share the same side, the two grids are said to be adjacent to each other. For all two adjacent grids, one of them is called the first grid, and the other is called the second grid; the first pattern in the first grid is not adjacent to the first pattern in the second grid, and the second pattern in the first grid is not adjacent to the second pattern in the second grid. The above configuration can ensure that the first pattern and the second pattern in the current grid are not in contact with the first pattern and the second pattern in the adjacent grid, respectively, and further reduce the probability of misjudgment in image recognition.

Figure 4:
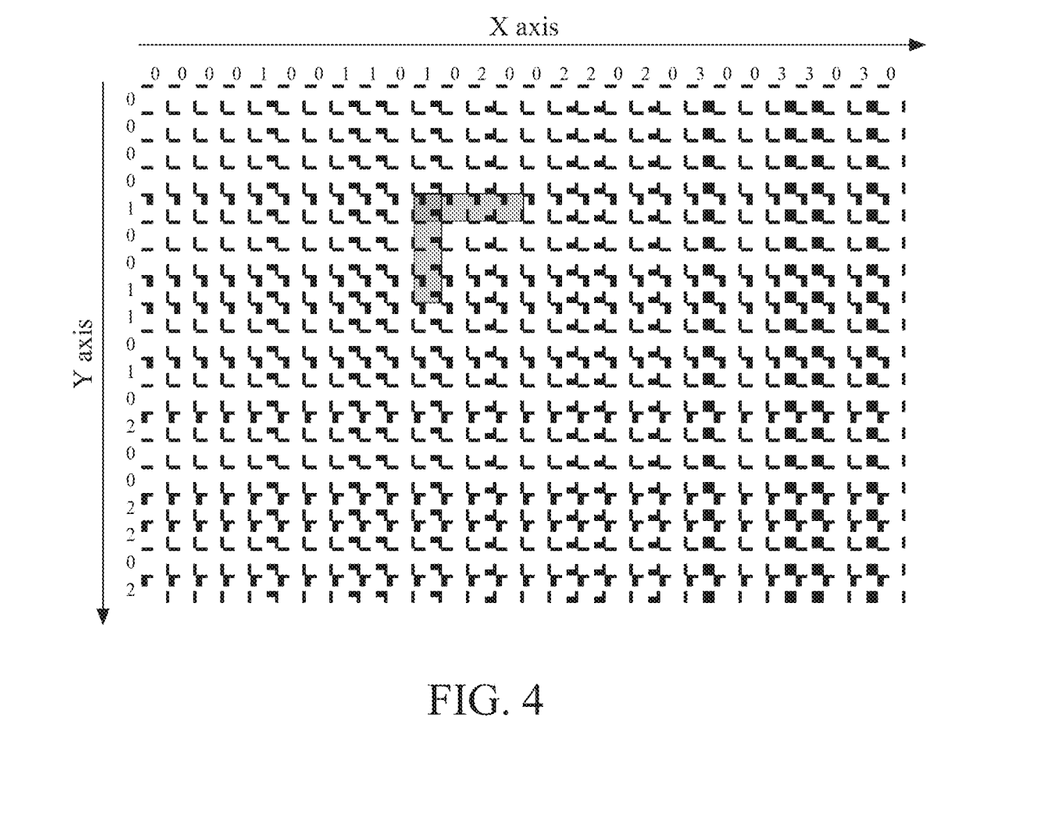
FIG. 4 is an example of a large-scale encoded substrate according to an embodiment of the disclosure.

The encoded substrate provided by an embodiment of the disclosure is adapted to being captured by a camera device to generate an image, and the processor scans a plurality of grids captured in the image. In the first dimension, the processor outputs the first coordinates according to at least two first patterns corresponding to at least two consecutive grids. In the second dimension, the processor outputs the second coordinates according to at least two second patterns corresponding to at least two consecutive grids. FIG. 4 is an example of a large-scale encoded substrate. The numbers below the X-axis are the first-dimensional encoded values, and the numbers on the right of the Y-axis are the second-dimensional encoded values. The corresponding relationship presented in Table 1 below includes the encoded sequence, four consecutive encoded values taken from this sequence, and the coordinates represented by these four encoded values. The corresponding relationship in Table 1 is applicable to the first dimension and the second dimension.

TABLE 1

| Sequence | 0 0 0 0 1 0 0 1 1 0 1 0 2 0 0 2 2 0 2 0 | | | | | | |
|---|---|---|---|---|---|---|---|
| Encoded value | 0000 | 0001 | 0010 | 0100 | ... | 1020 | 0200 ... |
| Coordinate | 0 | 1 | 2 | 3 | ... | 10 | 11 ... |

The first coordinate can be decoded according to four consecutive encoded values of the first dimension, and the second coordinate can be decoded according to four consecutive encoded values of the second dimension. For example, in the L-shaped area marked in FIG. 4, four consecutive first-dimensional encoded values are "1020", which means that the first coordinate is 10; four consecutive second-dimensional encoded values are "1001", which means that the second coordinate is 4. Therefore, the coordinate of the intersection of the L-shaped area is (10, 4). The following uses the first-dimensional encoded value as an example to illustrate the method of generating the first-dimensional encoded values, and the second-dimensional encoded value can also be generated in the same manner.

In the direction of the first dimension, a plurality of consecutively arranged grids correspond to a plurality of first patterns, and the plurality of first-dimensional encoded values corresponding to these first patterns are related to the de Bruijn sequence, but the disclosure is not limited to this. The de Bruijn sequence is a cyclic sequence, denoted as $B(k, n)$, which is defined as follows. Each substring of length n and consisting of elements such as $\{0, 1, \ldots, k-1\}$ only appears once in this sequence. For example, a solution of $B(2, 3)$ is the sequence "00010111", in which all subsequences of length 3 and composed of elements such as $\{0, 1\}$ are 000, 001, 010, 101, 011, 111, 110, 100.

Please refer to FIG. 3, select two non-repeating encoded values from the eight encoded values 0~7, and satisfy that the encoded values of the first selection are less than the encoded values of the second selection. 28 permutations ($8\times7\div2=28$) can be listed, including "01", "02", "03", ..., "07", "12", "13", ..., "17", ..., and "67". The disclosure modifies a sequence "0000100110101111" of $B(2, 4)$ based on the above arrangement, which can be described as follows.

For the combination "01", modify the sequence to "0000010011010 ~~1111~~"

For the combination "02", modify the sequence to "~~0000~~ 20022020 ~~2222~~"; ...

For the combination "12", modify the sequence to "111121122121 ~~2222~~"; ...

For the combination "13", modify the sequence to "~~1111~~ 31133131 ~~3333~~"; ...

For the combination "67", modify the sequence to "~~6666~~ 76677676 ~~7777~~".

In the above modification, since "0000", "1111", "2222", ..., "7777" and other subsequences will appear repeatedly, therefore, the disclosure only retains the first occurrence of the subsequences, and deletes the subsequent repeated subsequences. According to the above method, the disclosure generates an encoded sequence with a length of 252 characters, which is "00001001101020022020300330304004404050055 05060066060700770701111211222121 311331314114414151155151611661617117717 1222 232233232422442425225525262266 2627227727233334334434353355353633663637337 737344445445545464466464744774 7455556556656575577575666676677676".

If the size of one grid is 1 cm×1 cm, the size supported by the encoded substrate constructed according to the above encoded sequence can reach 6.3504 square meters (2.52 m×2.52 m).

Figure 5:
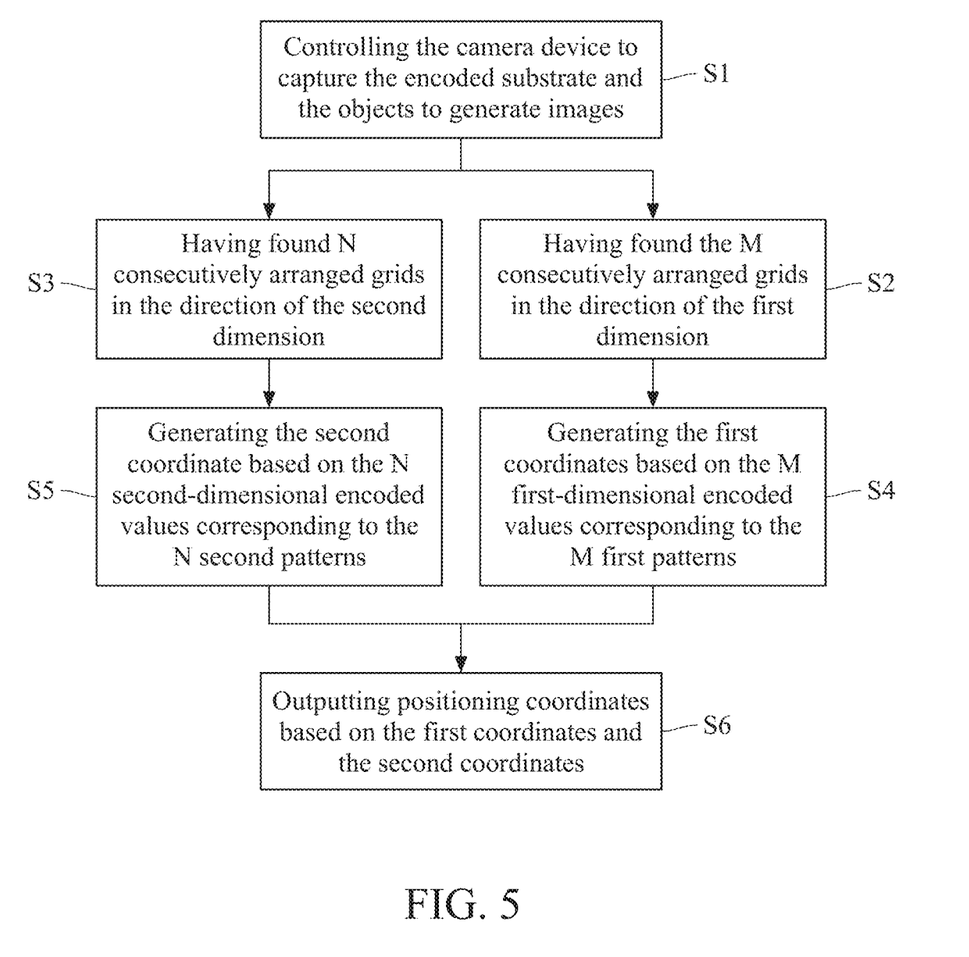
FIG. 5 is a flowchart of a coordinate positioning method according to an embodiment of the disclosure

FIG. 5 is a flowchart of a coordinate positioning method according to an embodiment of the disclosure. The method is suitable for the scene shown in FIG. 6A, and the scene includes the said encoded substrate and multiple objects arranged on the encoded substrate. The method includes the following steps (step S1 to step S6) performed by the processor, wherein=step S1 is "controlling the camera device to capture the encoded substrate and the objects to generate images", step S2 is "having found the M consecutively arranged grids in the direction of the first dimension", step S3 is "having found N consecutively arranged grids in the direction of the second dimension", step S4 is "generating the first coordinates based on the M first-dimensional encoded values corresponding to the M first patterns", step S5 is "generating the second coordinate based on the N second-dimensional encoded values corresponding to the N second patterns", and step S6 is "outputting positioning coordinates based on the first coordinates and the second coordinates"; wherein M and N are positive integers.

In step S1, the disclosure does not limit the angle at which the camera device captures the encoded substrate. For example, when the encoded substrate is set on a carrier board of the store shelf, the inventory staff can stand in front of the shelf and use a smartphone with the camera function to capture the carrier board and the goods on the carrier board. It may also set up a camera lens on the bottom surface of the upper carrier board to capture pictures of the lower carrier board.

In step S2, the found M grids must satisfy the condition that the M first patterns corresponding to the M grids are not covered by any object. Similarly, in step S3, the found N grids must satisfy the condition that the N second patterns corresponding to the N grids are not covered by any object. In an embodiment of the disclosure, M=N=4, but the disclosure does not limit the values of M and N.

The process of steps S2 to S4 is basically the same as the process of steps S3 to S5, and the difference lies in the dimensions used in image processing. The following uses the first dimension as an example to illustrate the implementation details of steps S2 to S4, and the flow from step S3 to step S5 can be deduced by analogy.

Figure 6A:
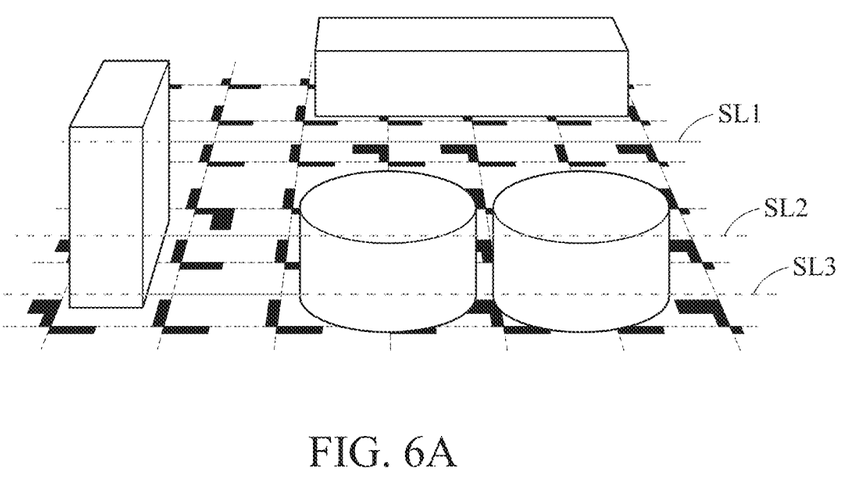
FIG. 6A to FIG. 6D are schematic diagrams of scenes when the coordinate positioning method in FIG. 5 is executed according to an embodiment of the disclosure.
Figure 7:
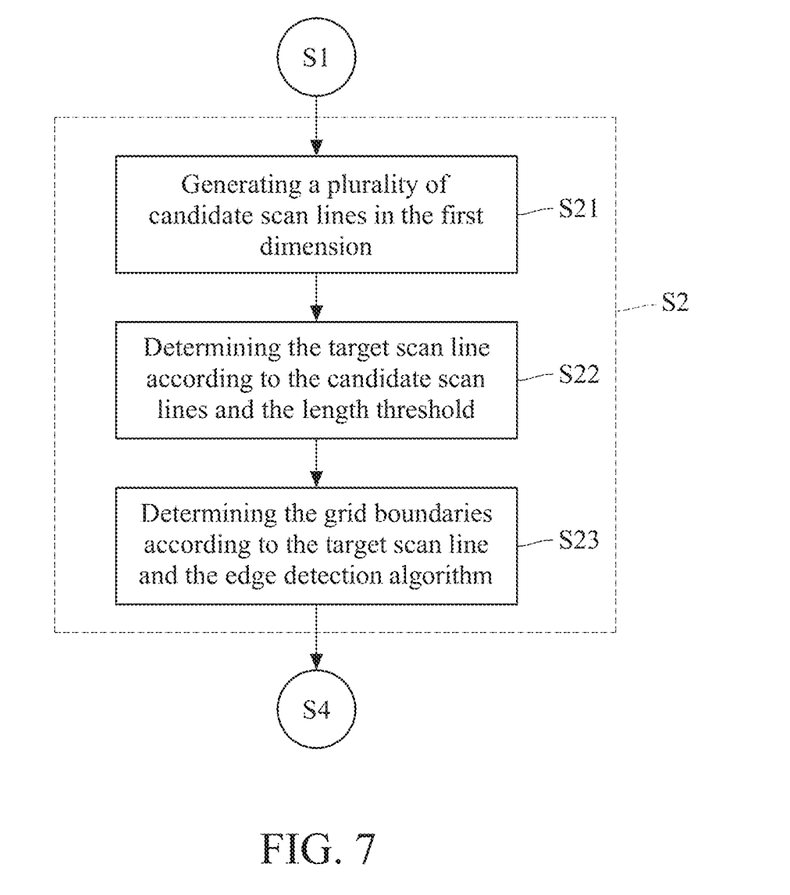
FIG. 7 and FIG. 8 are detailed flowcharts of steps S2 and S4 in FIG. 5, respectively.

FIG. 7 is a detailed flow chart of step S2 in FIG. 5. The method for finding out consecutively arranged M grids from multiple grids in the first dimension is as follows:

In step S21, in the first dimension, the processor generates a plurality of candidate scan lines such as SL1 to SL3 according to the image, as shown in FIG. 6A.

In step S22, the processor determines the target scan line SL1 according to the candidate scan lines SL1 to SL3 and a length threshold. The length threshold is related to the number of first-dimensional encoded values required to decode the first coordinate. In this example, the length threshold is the length of 4 grids. The target scan line SL1 is at least one of the candidate scan lines SL1 1 to SL3. In other words, the processor has found at least one horizontal scan line that "passes through the blank area in the middle of at least 4 grids" among all the horizontal scan lines SL1 to SL3 as the target scan line SL1.

Figure 6B:
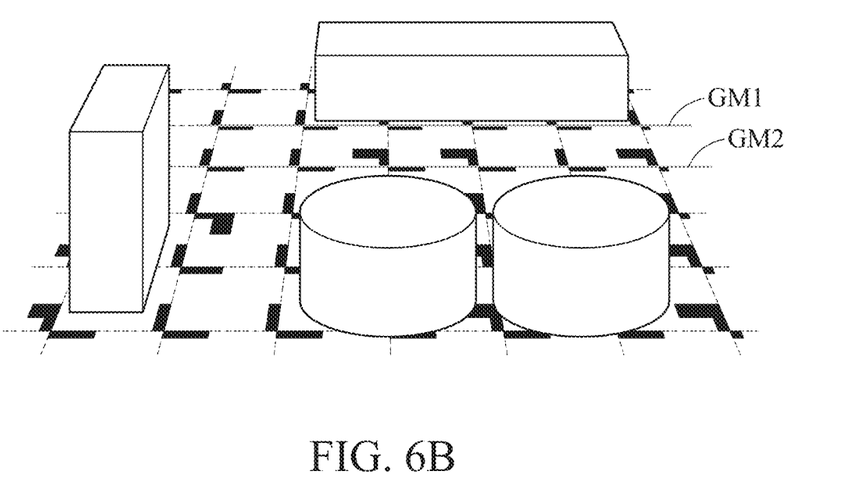

In step S23, the processor determines the grid boundaries GM1 and GM2 according to the target scan line SL1 and an edge detection algorithm, as shown in FIG. 6B. In detail, the processor has first found two candidate regions according to the target scan line SL1 and a specified width, and then finds two grid edges GM1 and GM2 that meets the specified conditions in these two regions, respectively. The specified width may be half the length of the grid, the two candidate regions are formed by extending the specified width from both sides of the target scan line SL1, and the specified condition is a straight line that is the one with the highest overlap ratio with the first pattern. The edge detection algorithm is, for example, a random sampling consensus algorithm (RANdom SAmple Consensus, RANSAC). This algorithm randomly samples a plurality of candidate points to establish a straight line, and then calculates the overlap ratio of the straight line and the first pattern.

Figure 8:
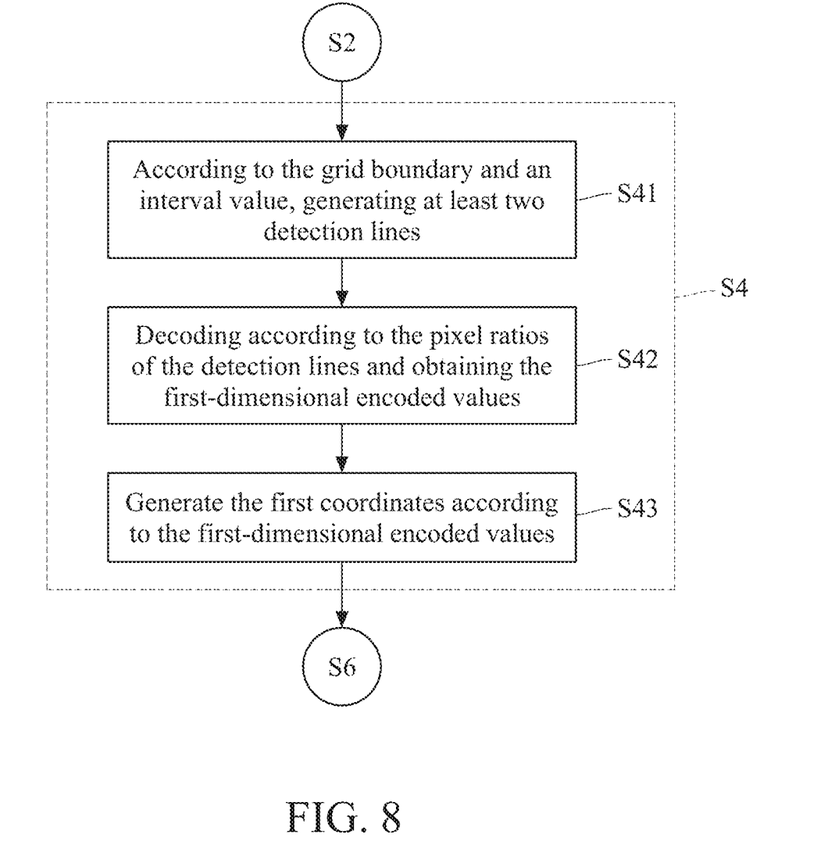

FIG. 8 is a detailed flow chart of step S4 in FIG. 5. The steps for generating the first coordinate according to the M first-dimensional encoded values corresponding to the M first patterns are as follows. Step S41 is "according to the grid boundary and an interval value, generating at least two detection lines", step S42 is "decoding according to the pixel ratios of the detection lines and obtaining the first-dimensional encoded values", and step S43 is "generate the first coordinates according to the first-dimensional encoded values".

Figure 6C:
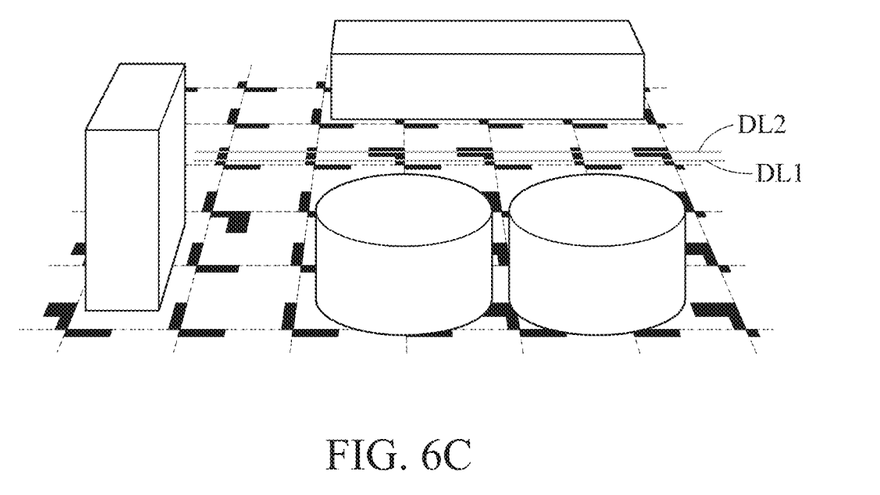
Figure 9:
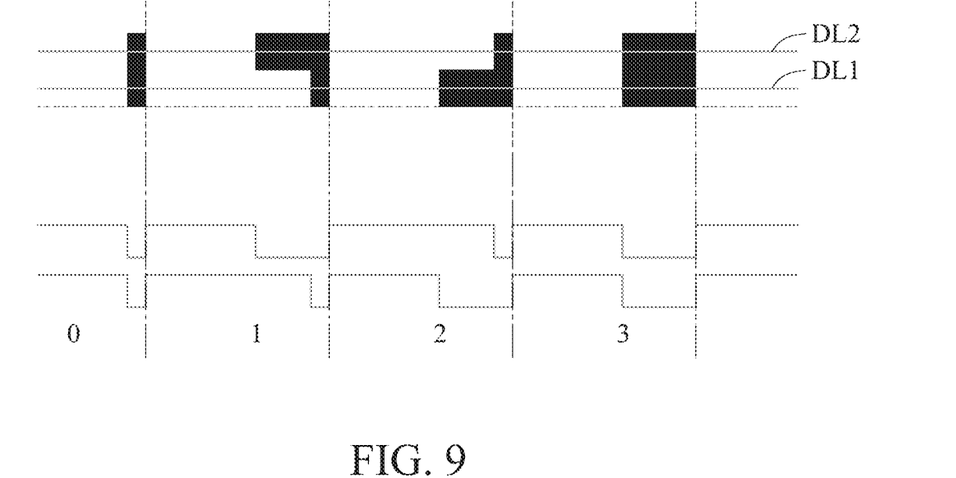
FIG. 9 is a schematic diagram of judging the first-dimensional encoded value based on the detection lines.

In step S23, the grid boundaries GM1 and GM2 have been known, and the grid side length d and the ratio between the side length of the first pattern and the grid side length d can be obtained according to FIG. 2; therefore, in step S41, shifting a specific pitch value (for example, 0.1 d and 0.3 d) from the grid boundary line GM1 toward the inside of the grid can obtain two detection lines DL1 and DL2 that pass through two pixel blocks of the first pattern, as shown in FIG. 6C. Please refer to FIG. 6C and FIG. 9 together. FIG. 9 is a schematic diagram of two detection lines DL1 and DL2 that respectively pass through two pixel blocks forming the first pattern.

In other embodiments, if the first pattern is composed of n pixel blocks, n detection lines need to be generated in step S41.

In step S42, the processor performs a decoded operation according to a length ratio of the black pixels and the white pixels on the detection lines DL1 and DL2, and obtains at least two first-dimensional encoded values, as shown in FIG. 9. In this example, the detection lines DL1 and DL2 pass through four grids, so four first-dimensional encoded values will be generated in step S42.

In step S43, the processor may query Table 1 according to the first-dimensional encoded values to generate the first coordinates.

Figure 6D:
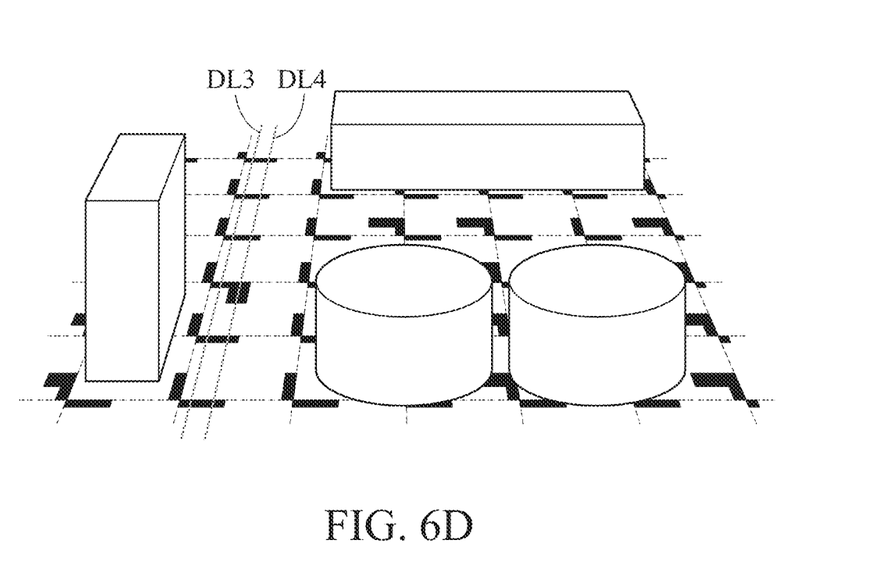

As mentioned above, the implementation details of step S3 can be adaptively modified according to the process shown in FIG. 7, and the implementation details of step S5 can be adaptively modified according to the process flow shown in FIG. 8. Please refer to FIG. 6D, which shows a schematic diagram of the processor generating two detection lines DL3 and DL4 in the direction of the second dimension.

Please refer to step S6 in FIG. 5. If the processor confirms that one of the M grids is the same as one of the N grids, it is equivalent to having found the intersection of the L-shaped area shown in FIG. 4, and the coordinate value of the intersection in the first dimension is the first coordinate, and the coordinate value in the second dimension is the second coordinate. The positioning coordinates output by the processor include a first coordinate and a second coordinate.

Figure 10:
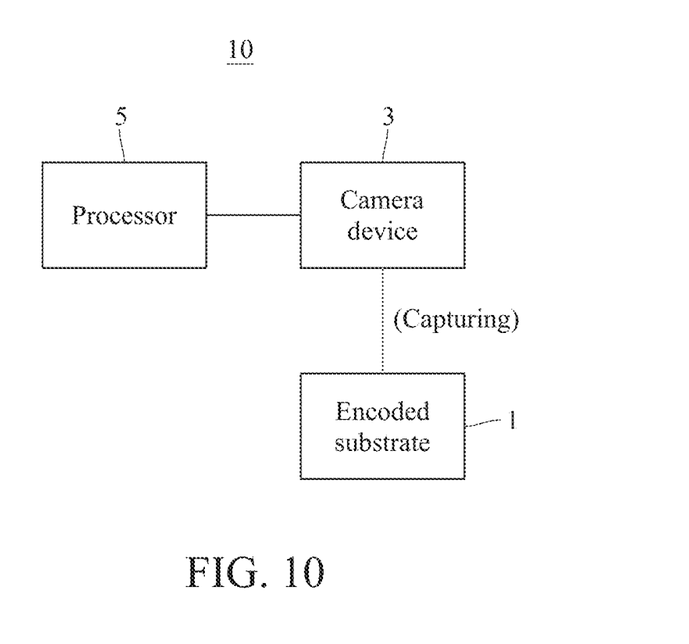
FIG. 10 is a block diagram of a coordinate positioning system according to an embodiment of the disclosure.

FIG. 10 is a block diagram of a coordinate positioning system according to an embodiment of the disclosure. As shown in FIG. 10, the coordinate positioning system includes said encoded substrate 1, said camera device 3 and said processor 5. The camera device 3 is used to capture the encoded substrate to generate an image. The processor 5 is electrically connected to the camera device 3, and the processor is used to execute the coordinate positioning method according to said coordinate positioning method according to the image to generate the positioning coordinate.

In summary, the disclosed encoded substrate only needs to find a specified number of complete grid images in each of the first dimension and the second dimension to be decoded. The first pattern and the second pattern in the grid proposed by the disclosure simplifies the encoding method. In this way, it only needs to detect the continuous occurrence of the first pattern and the second pattern, instead of identifying the complete quick response (QR) code. Once the information completeness of the two-dimensional identification code such as QR code is insufficient, the identification will fail. In addition, the above settings according to the present disclosure also make the grid size much smaller than the large-scale encoded pattern. Therefore, the exemplary embodiments according to the present disclosure is substantially suitable for the spatial positioning of shelf laminates, because the goods on the shelf are usually tightly arranged. While the two-dimensional identification code cannot be completely photographed in the narrow vacant area of the laminate due to their large size, thereby, accurate spatial positioning information cannot be obtained. In contrast to the encoded substrate proposed by the present disclosure, its visual encoded style only needs to recognize the narrow and long vacant areas at the bottom of the shelf layer plate for positioning, which conforms to the characteristics of the shelf merchandise display.

It will be apparent to those skilled in the art that various modifications and variations can be made to the phase control structure and the phase control array of the disclosed embodiments. It is intended that the specification and examples be considered as exemplars only, with a scope of the disclosure being indicated by the following claims and their equivalents.

What is claimed is:

1. An encoded substrate comprising:
a plurality of grids arranged in a two-dimensional array, wherein each of the plurality of grids includes a first pattern and a second pattern, with the first pattern not overlapping the second pattern, the first pattern corresponds to a first-dimensional encoded value, the second pattern corresponds to a second-dimensional encoded value, the plurality of grids includes a first grid and a second grid adjacent to the first grid, the first pattern in the first grid is not adjacent to the first pattern in the second grid, the second pattern in the first grid is not adjacent to the second pattern in the second grid, in a first-dimensional direction, at least two first patterns corresponding to at least two grids consecutively arranged in the plurality of grids are associated with a first coordinate, and in a second-dimensional direction, at least two second patterns corresponding to at least two grids consecutively arranged in the plurality of grids are associated with a second coordinate.

2. The encoded substrate according to claim 1, wherein in the first-dimensional direction, the first-dimensional encoded value corresponding to the first pattern continuously arranged in the plurality of grids are related to one de Bruijn sequence.

3. The encoded substrate according to claim 1, wherein the first pattern includes a plurality of types, and each of the types is composed of at least two pixel blocks.

4. A coordinate positioning method adapted to an encoded substrate, wherein a plurality of objects are arranged on the encoded substrate, the encoded substrate includes a plurality of grids arranged in a two-dimensional array, and the method includes:
capturing the encoded substrate and the plurality of objects to generate an image by a camera device;
scanning the plurality of grids from the image by a processor;
in a first-dimensional direction, locating M grids arranged continuously from the plurality of grids;
in a second-dimensional direction, locating N grids arranged continuously from the plurality of grids;
generating a first coordinate according to M first-dimensional encoded values corresponding to M first patterns;
generating a second coordinate according to N second-dimensional encoded values corresponding to N second patterns, wherein M, N are positive integers; and outputting a positioning coordinate according to the first coordinate and the second coordinate; wherein the M grids corresponding to the M first patterns are not covered by the objects;

the N grids corresponding to the N second patterns are not covered by the objects; and one of the M grids is the same as one of the N grids;

wherein each of the plurality of grids includes a first pattern and a second pattern, with the first pattern not overlapping the second pattern, the first pattern corresponds to a first-dimensional encoded value and the second pattern corresponds to a second-dimensional encoded value the plurality of grids includes a first grid and a second grid adjacent to the first grid, the first pattern in the first grid is not adjacent to the first pattern in the second grid, the second pattern in the first grid is not adjacent to the second pattern in the second grid.

5. The coordinate positioning method according to claim 4, wherein in the first-dimensional direction, the step of having found consecutively arranged M grids from the plurality of grids includes:

in the first-dimensional direction, generating a plurality of candidate scan lines according to the image, and determining one of the plurality of candidate scan lines as a target scan line according to the plurality of candidate scan lines and a length threshold; and having found a grid boundary according to the target scan line and an edge detection algorithm.

6. The coordinate positioning method according to claim 5, the step of generating the first coordinate according to the M first-dimensional encoded values corresponding to the M first patterns including:

generating at least two detection lines according to the grid boundary and an interval value;

decoding according to at least two pixel ratios of the at least two detection lines and obtaining at least two first-dimensional encoded values; and generating the first coordinate according to the at least two first-dimensional encoded values.

7. The coordinate positioning method according to claim 5, wherein the edge detection algorithm includes a random sampling consensus algorithm.

8. A coordinate positioning system, comprising:

an encoded substrate;

a camera device, used to capture the encoded substrate to generate an image; and a processor, electrically connected to the camera device, and the processor is used to execute a coordinate positioning method according to the image to generate a positioning coordinate;

wherein the encoded substrate comprises a plurality of grids arranged in a two-dimensional array, wherein each of the plurality of grids includes a first pattern and a second pattern, with the first pattern not overlapping the second pattern, wherein the first pattern corresponds to a first-dimensional encoded value and the second pattern corresponds to a second-dimensional encoded value, the plurality of grids includes a first grid and a second grid adjacent to the first grid, the first pattern in the first grid is not adjacent to the first pattern in the second grid, the second pattern in the first grid is not adjacent to the second pattern in the second grid; and the image is processed by the processor for scanning the plurality of grids; wherein, in a first-dimensional direction, the processor outputs a first coordinate according to at least two first patterns corresponding to at least two grids consecutively arranged in the plurality of grids; and in a second-dimensional direction, the processor outputs a second coordinate according to at least two second patterns corresponding to at least two grids consecutively arranged in the plurality of grids.

* * * * *